United States Patent
Kobayashi (10) Patent No.: US 9,835,389 B2
(45) Date of Patent: Dec. 5, 2017

(54) GAS PIPE FOR EXHAUST GAS RECIRCULATION

(71) Applicant: TOYOTA JIDOSHA KABUSHIKI KAISHA, Toyota-shi, Aichi-ken (JP)

(72) Inventor: Shinichi Kobayashi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 317 days.

(21) Appl. No.: 14/733,453

(22) Filed: Jun. 8, 2015

(65) Prior Publication Data

US 2015/0354508 A1  Dec. 10, 2015

(30) Foreign Application Priority Data

Jun. 10, 2014  (JP) ................. 2014-119747

(51) Int. Cl.

| | |
|---|---|
| F28F 7/02 | (2006.01) |
| F02M 35/10 | (2006.01) |
| F02B 29/04 | (2006.01) |
| F28F 1/40 | (2006.01) |
| B22C 7/06 | (2006.01) |
| F28D 21/00 | (2006.01) |
| F02M 26/29 | (2016.01) |
| F02M 26/41 | (2016.01) |

(Continued)

(52) U.S. Cl.
CPC .................. *F28F 7/02* (2013.01); *B22C 7/06* (2013.01); *F02B 29/045* (2013.01); *F02M 26/01* (2016.02); *F02M 26/29* (2016.02); *F02M 26/41* (2016.02); *F02M 35/10222* (2013.01); *F28D 21/0003* (2013.01); *F28F 1/40* (2013.01); *F02F 1/24* (2013.01); *Y02T 10/146* (2013.01)

(58) Field of Classification Search
CPC ........... F02M 25/0735; F02M 25/0736; F02M 26/05; F02M 26/06; F02M 26/04; F02M 26/43; F02M 26/19; F02M 26/23; F02M 26/33; F02M 35/10222; F02M 26/52; F02M 26/09; F02M 26/29; F02M 26/02; F28F 1/40; F28F 7/02; B22C 9/10; B22C 7/06; F02B 29/045
USPC ........................................ 123/568.11–568.32
See application file for complete search history.

(56) References Cited

U.S. PATENT DOCUMENTS

| | | | |
|---|---|---|---|
| 2007/0221181 A1* | 9/2007 | Maucher ................... | F01N 3/04 123/568.12 |
| 2009/0056682 A1* | 3/2009 | Okawa .................... | F02M 26/30 123/568.12 |

(Continued)

FOREIGN PATENT DOCUMENTS

| | | |
|---|---|---|
| EP | 1 251 466 A2 | 10/2002 |
| EP | 1 992 821 A1 | 11/2008 |
| JP | 2011-111938 A | 6/2011 |

*Primary Examiner* — Sizo Vilakazi
(74) *Attorney, Agent, or Firm* — Oliff PLC (57) ABSTRACT

A plurality of upper fins and a plurality of lower fins are each provided in an EGR passage so as to be adjacent to each other across a predetermined space in a direction perpendicular to an exhaust-gas flow direction. The upper fins and the lower fins are gradually narrowed in width toward their respective projection directions, so that both sides thereof in their width direction have inclined surfaces. A tilt angle of the inclined surfaces of the lower fins is made larger than a tilt angle of the inclined surfaces of the upper fins.

4 Claims, 7 Drawing Sheets

(51) Int. Cl.
*F02M 26/01* (2016.01)
*F02F 1/24* (2006.01)

(56) References Cited

U.S. PATENT DOCUMENTS

2010/0050631 A1\* 3/2010 Yager .................. F01N 5/02
60/604
2010/0050634 A1\* 3/2010 Yager .................. F02M 26/05
60/605.2

\* cited by examiner

GAS PIPE FOR EXHAUST GAS RECIRCULATION

INCORPORATION BY REFERENCE

The disclosure of Japanese Patent Application No. 2014-119747 filed on Jun. 10, 2014 including the specification, drawings and abstract is incorporated herein by reference in its entirety.

BACKGROUND OF THE INVENTION

1. Field of the Invention

The present invention relates to an EGR pipe provided with a plurality of upper fins and lower fins.

2. Description of Related Art

Japanese Patent Application Publication No. 2011-111938 (JP 2011-111938 A), for example, describes a configuration in which part of exhaust gas discharged from a combustion chamber of an internal combustion engine is flowed back to an intake side of the combustion chamber.

In order to improve cooling performance, an EGR passage portion configured to flow back the exhaust gas is provided with a plurality of upper fins and lower fins having an increased heat exchange area with the exhaust gas. The upper fins and the lower fins are provided along an exhaust gas flow direction (a lengthwise direction of the EGR passage portion), and the plurality of upper fins and the plurality of lower fins are provided so as to face each other across a predetermined space in a direction (a width direction of the EGR passage portion) perpendicular to the lengthwise direction of the EGR passage portion. Further, since the upper fins and the lower fins are placed at positions where the upper fins correspond to the lower fins in the width direction of the EGR passage portion, the upper fins and the lower fins are provided so as to face each other across a predetermined space in a height direction of the EGR passage portion. Heights of the upper fins and the lower fins are set to be generally constant over a whole length of the EGR passage portion. The upper fins and the lower fins are narrowed in width toward their respective projection directions, so that both sides thereof in the width direction have inclined surfaces.

SUMMARY OF THE INVENTION

In the conventional example according to JP 2011-111938 A, a tilt angle of the inclined surfaces on both sides of the upper fin in its width direction is the same as a tilt angle of the inclined surfaces on both sides of the lower fin in its width direction. Accordingly, when an upper die and a lower die for sand-core molding are opened in a course of manufacturing a sand core to be inserted into a mold used for molding the EGR passage, a mold release resistance of the upper die is equal to a mold release resistance of the lower die. Because of this relationship, it is hard to separate the molded sand core from both the upper die and the lower die, so that the molded sand core may be torn up in an up-down direction. It goes without saying that the sand core has the same shape as a space of the EGR passage.

The present invention restrains a molded sand core from being damaged at the time when an upper die and a lower die for sand-core molding are opened in a course of manufacturing a sand core to be inserted into a mold used for molding an EGR passage.

A gas pipe according to one aspect of the present invention is a gas pipe for sending exhaust gas discharged from an engine to an air-intake system of the engine, and the gas pipe includes: first fins; and second fins, the first fins and the second fins being configured such that: a) the first fins project from a first region of an inner peripheral surface of the gas pipe; b) the second fins project from a second region of the inner peripheral surface of the gas pipe, the second region being opposed to the first region; c) the second fins face the first fins across a predetermined space; d) the first fins are provided along an exhaust-gas flow direction; e) the second fins are provided along the exhaust-gas flow direction; f) the first fins are provided so as to be adjacent to each other across a predetermined space in a direction perpendicular to the exhaust-gas flow direction; g) the second fins are provided so as to be adjacent to each other across a predetermined space in the direction perpendicular to the exhaust-gas flow direction; h) a thickness of the first fins in the direction perpendicular to the exhaust-gas flow direction is gradually thinned toward a projection direction of the first fins, such that both surfaces of each of the first fins along the exhaust-gas flow direction are inclined; i) a thickness of the second fins in the direction perpendicular to the exhaust-gas flow direction is gradually thinned toward a projection direction of the second fins, such that both surfaces of each of the second fins along the exhaust-gas flow direction are inclined; and j) a tilt angle of either ones of inclined surfaces of the first fins and inclined surfaces of the second fins is larger than a tilt angle of the other ones of the inclined surfaces of the first fins and the inclined surfaces of the second fins. That is, the one aspect of the present invention has the following configuration in an EGR pipe for sending exhaust gas discharged from an engine to an air-intake system of the engine.

The EGR passage includes: a first fin projecting from a predetermined region of an inner peripheral surface of the EGR passage; and a second fin projecting from another region of the inner peripheral surface which region is opposed to the predetermined region where the first fin is provided. The second fin is provided so as to be opposed to the first fin across a predetermined space. A plurality of first fins and a plurality of second fins are each provided along the exhaust-gas flowing direction, so as to be adjacent to each other across a predetermined space in a direction perpendicular to the exhaust-gas flow direction. The first fin and the second fin are gradually narrowed in width toward their respective projection directions, so that both sides thereof in the width direction have inclined surfaces. A tilt angle of either ones of the inclined surfaces of the first fin and the inclined surfaces of the second fin is larger than a tilt angle of the other ones of them.

In a case where the first fin and the second fin are provided according to the above configuration, a heat exchange area with the exhaust gas increases as compared with a case where no fin is provided, so that cooling performance to the exhaust gas improves.

Besides, like the configuration in the one aspect of the present invention, in a case where the tilt angle of either ones of the inclined surfaces of the first fin and the inclined surfaces of the second fin is larger than the tilt angle of the other ones of them, when an upper die and a lower die for sand-core molding are opened in a course of manufacturing a sand core to be inserted into a mold used for molding the EGR passage according to the present invention, a difference is caused between a mold release resistance of the upper die and a mold release resistance of the lower die.

Hereby, one of the dies (the upper die or the lower die) is easy to be separated from that projection portion of the molded sand core which corresponds to the fin having the inclined surfaces with a larger tilt angle, while the other die (the lower die or the upper die) is kept attached to that projection portion of the molded sand core which corresponds to the fin having the inclined surfaces with a smaller tilt angle. As a result, the molded sand core is hard to be damaged. Thus, a manufacture yield of the sand core improves, which is advantageous to decrease a manufacturing cost of the EGR passage according to the present invention.

The above aspect may be configured as follows: the first fins project downward in a vertical direction; the second fins project upward in the vertical direction; and the tilt angle of the inclined surfaces of the second fins is larger than the tilt angle of the inclined surfaces of the first fins.

According to the configuration, when the upper die and the lower die for sand-core molding are opened, the mold release resistance of the lower die becomes smaller than the mold release resistance of the upper die.

This allows the lower die to be easily separated from the molded sand core, and the upper die is kept attached to the molded sand core. Subsequently, the sand core is pushed out from the upper die.

Besides, according to the configuration, a pressure loss in an opposed space to each lower fin is reduced, so that an amount of the exhaust gas passing through the opposed space increases, thereby making it possible to remove condensed water accumulated in the opposed space, by the exhaust gas.

The above aspect may be configured as follows: the first fins project downward in a vertical direction; the second fins project upward in the vertical direction; the gas pipe includes an inlet portion for the exhaust gas, an outlet portion for the exhaust gas, and an intermediate portion placed between the inlet portion and the outlet portion; the intermediate portion is placed lower than the inlet portion and the outlet portion in the vertical direction; a height of the second fins at the intermediate portion is lower than a height of the second fins at the inlet portion and a height of the second fins at the outlet portion; and tip portions of the second fins at the intermediate portion are set to a position lower than a central position in the gas pipe in a height direction of the gas pipe.

According to the configuration, a sectional area of the intermediate portion of the EGR passage becomes as large as possible, so that the following four effects can be obtained.

The first effect is that the rigidity of the sand core to be used for molding the EGR passage improves, so the sand core is further hard to be damaged during manufacturing.

The second effect is that a flow resistance of the exhaust gas flowing through the EGR passage becomes small, so a pressure loss is reduced.

The third effect is as follows. That is, since the intermediate portion is placed lower than the inlet portion and the outlet portion in a gravitational direction in the EGR passage, condensed water is easy to be accumulated in the intermediate portion. However, the height of the lower fin at the intermediate portion is set to be lower than the heights of the lower fin in the other regions, so that condensed water generated in the intermediate portion can be reduced, thereby making it possible to reduce the condensed water retained in the intermediate portion.

The fourth effect is as follows. In the intermediate portion, the exhaust gas is easy to enter a bottom (root sides of the lower fins) of a part with a large exhaust-gas flow resistance (the opposed spaces adjacent to respective lower fins), and the exhaust gas is easy to flow along the bottoms. Accordingly, that condensed water of the exhaust gas which is accumulated in the bottom is blown off toward the outlet portion by the exhaust gas flowing through the bottom of the part with a large exhaust-gas flow resistance in the intermediate portion, so that the condensed water is easy to be discharged outside.

The gas pipe in the aspect may be provided inside a cylinder head.

According to the configuration, a manufacture yield of the cylinder head improves when the cylinder head is casted, thereby making it possible to contribute to a reduction of the manufacturing cost of the cylinder head. Further, the exhaust gas can be cooled by cooling water for the cylinder head. This makes it possible to reduce a size of an EGR cooler connected to the EGR passage. Alternatively, it is possible to eliminate the EGR cooler itself.

According to the EGR passage of the present invention, the molded sand core is hard to be damaged at the time when the upper die and the lower die for sand-core molding are opened in a course of manufacturing the sand core to be inserted into the mold used for molding the EGR passage.

Thus, a manufacture yield of the sand core improves, which is advantageous to decrease a manufacturing cost of the EGR passage according to the present invention.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes an embodiment for carrying out the present invention in detail with reference to the attached drawings.

One embodiment of the present invention is illustrated in FIGS. 1 to 6. A cylinder head 1 and an EGR passage 2 are illustrated herein. The present embodiment deals with an example in which the EGR passage 2 is formed integrally inside the cylinder head 1.

The EGR passage 2 is provided on a rear side inside the cylinder head 1. A front (Fr) side and the rear (Rr) side of the cylinder head 1 correspond to a front side and a rear side of an engine (not shown). The front side of the engine indicates a side where a power train configured to transmit a rotational power of a crank shaft to a cam shaft is placed. The rear side of the engine indicates a side opposite to the side where the power train is placed.

An inlet portion 21 of the EGR passage 2 is connected to an exhaust passage (not shown) of the cylinder head 1. Further, an outlet portion 22 of the EGR passage 2 is connected to an intake passage of the cylinder head 1 via an EGR cooler and an EGR valve, although not illustrated herein. Hereby, part of exhaust gas (also referred to as EGR gas) discharged from the engine to the exhaust passage flows into the EGR passage 2 via the inlet portion 21, and the exhaust gas discharged from the outlet portion 22 via an intermediate portion 23 is introduced into the intake passage via the EGR cooler and the EGR valve.

Note that the inlet portion 21 indicates an "upstream region in an exhaust-gas flow direction," the outlet portion 22 indicates a "downstream region in the exhaust-gas flow direction," and the intermediate portion 23 is a region between the inlet portion 21 and the outlet portion 22. An opening of the inlet portion 21 serves as an "inlet," and an opening of the outlet portion 22 serves as an "outlet."

Figure 1:
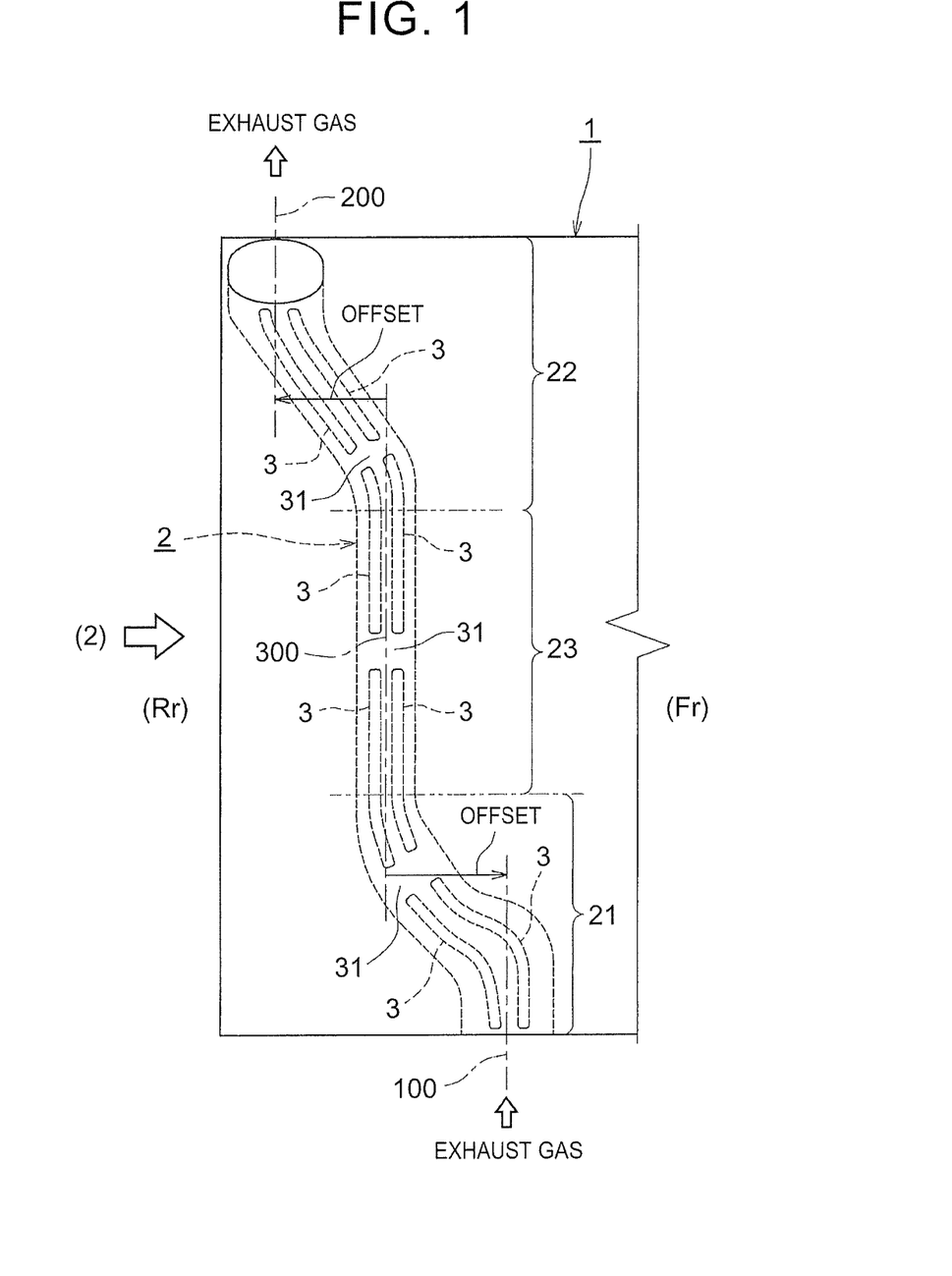
FIG. 1 is a plan view partially illustrating a rear side of a cylinder head in one embodiment of a cylinder head provided with an EGR passage according to the present invention.

In this embodiment, as illustrated in FIG. 1, a center line 300 of the intermediate portion 23 is linear in a top view of the EGR passage 2. An extended line 100 of a center of the opening of the inlet portion 21 is offset toward the front (Fr) side of the cylinder head 1 relative to the center line 300 of the intermediate portion 23. An extended line 200 of a center of the opening of the outlet portion 22 is offset toward the rear (Rr) side of the cylinder head 1 relative to the center line 300 of the intermediate portion 23.

Figure 2:
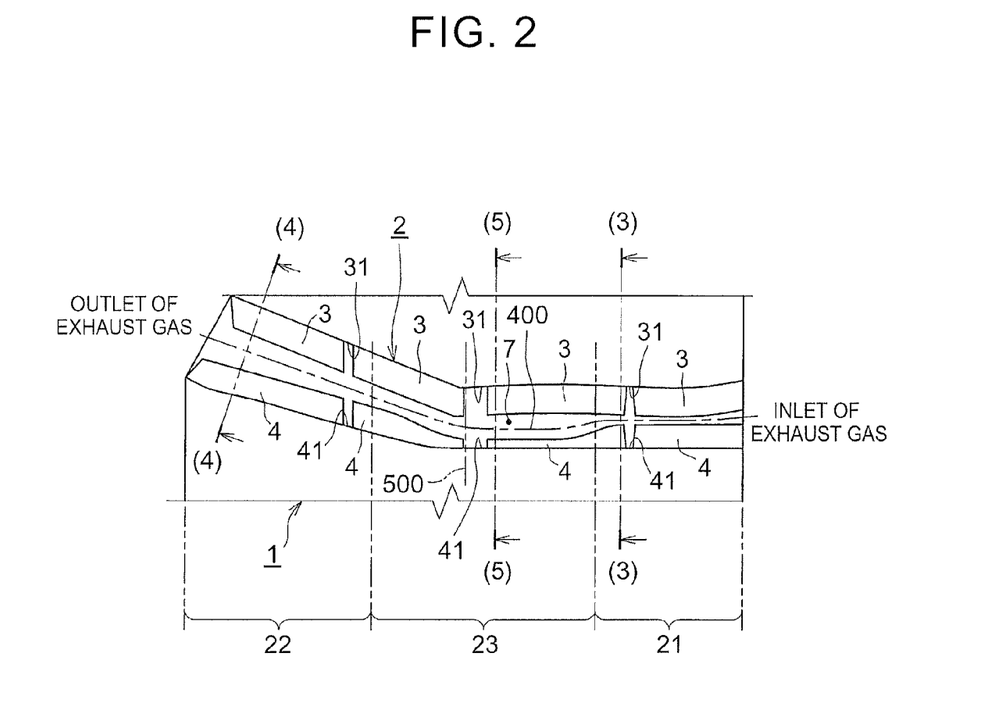
FIG. 2 is a view of the cylinder head in FIG. 1, when viewed from a direction of an arrow (2)

As illustrated in FIG. 2, an overall height dimension of the EGR passage 2 around a lengthwise-direction center 500 is smaller than the other parts (the inlet portion 21 and the outlet portion 22). A region from the lengthwise-direction center 500 to the opening of the outlet portion 22 is inclined diagonally upward. Hereby, the outlet portion 22 is placed at a position higher than the intermediate portion 23.

In order to increase a heat exchange area with exhaust gas, the EGR passage 2 configured as such is provided with upper fins 3 as first fins and lower fins 4 as second fins.

Note that an upper side or a lower side used in the present embodiment indicates an upper side or a lower side in a vertical direction.

The upper fins 3 are provided in an upper region (on a ceiling surface) of an inner peripheral surface of the EGR passage 2 so as to project downward. The lower fins 4 are provided in a lower region (on a bottom face) of the inner peripheral surface of the EGR passage 2 so as to project upward.

The upper fins 3 and the lower fins 4 are provided along the exhaust-gas flow direction (a lengthwise direction of the EGR passage 2). Further, the plurality of (two, in the present embodiment) upper fins 3 and lower fins 4 are provided across respective predetermined spaces in a direction (a width direction of the EGR passage 2) perpendicular to the lengthwise direction of the EGR passage 2.

Respective opposed spaces of the plurality of upper fins 3 adjacent to each other are referred to as "upper partition passages 5A, 5B, 5C," and respective opposed spaces of the plurality of lower fins 4 adjacent to each other are referred to as "lower partition passages 6A, 6B, 6C."

The upper fins 3 and the lower fins 4 are placed at positions where the upper fins 3 correspond to the lower fins 4 in the width direction of the EGR passage 2, so that the upper fins 3 face the lower fins 4 across a predetermined space in a height direction of the EGR passage 2. This opposed space is referred to as a "main passage 7."

In a case where the upper fins 3 and the lower fins 4 are provided within the EGR passage 2 as such, the exhaust gas is easy to flow through the main passage 7, but the exhaust gas is hard to flow through bottom-side areas of the upper and lower partition passages 5A to 5C, 6A to 6C (areas closer to roots of the upper and lower fins 3, 4).

Needless to say, this is because a sectional area of the main passage 7 is larger than respective sectional areas of the upper and lower partition passages 5A to 5C, 6A to 6C, and an exhaust-gas flow resistance in the main passage 7 is smaller than that of the upper and lower partition passages 5A to 5C, 6A to 6C.

In consideration of this point, the main passage 7 is referred to as a "part with a small exhaust-gas flow resistance," and the upper and lower partition passages 5A to 5C, 6A to 6C are referred to as a "part with a large exhaust-gas flow resistance." That is, the exhaust gas introduced into the EGR passage 2 flows through the main passage 7 with a small flow resistance in a concentrated manner, so that a flow speed of the exhaust gas flowing through the main passage 7 becomes faster than a flow speed of the exhaust gas flowing through the upper and lower partition passages 5A to 5C, 6A to 6C.

In the present embodiment, disconnected portions 31, 41 are provided at several parts of the upper fins 3 and the lower fins 4 in the longitudinal direction, as illustrated in FIG. 2.

The disconnected portions 31, 41 are provided at three parts, i.e., a part around the lengthwise-direction center 500, a part around a boundary between the inlet portion 21 and the intermediate portion 23, and a part around a boundary between the outlet portion 22 and the intermediate portion 23. Although not illustrated herein, the disconnected portions 31, 41 are secured as placement regions for push-out pins incorporated in an upper die and a lower die, so that, generally, when the upper die and the lower die are opened to manufacture a sand core for the EGR passage 2, the molded sand core is successfully detached from the upper die and the lower die.

Incidentally, the cylinder head 1 is a casting. Although not illustrated herein, a manufacturing method of the cylinder head 1 is as follows: a sand core to be used for molding the EGR passage 2 is inserted into an internal space made by an upper mold and a lower mold to mold the cylinder head 1; and a molten material (e.g., aluminum alloy or the like) is poured into the internal space. When the molten material is hardened and the cylinder head 1 is molded, the upper mold and the lower mold are opened to remove the sand core from the cylinder head 1, so that a space to serve as the EGR passage 2 is formed in the cylinder head 1. On this account, the sand core has the same shape as the space of the EGR passage 2.

In the meantime, as described above, in a case where the upper fins 3 and the lower fins 4 are provided within the EGR passage 2 as such, the exhaust gas flowing into the EGR passage 2 flows while making contact with the upper fins 3 and the lower fins 4 in a course of passing through the main passage 7 and the upper and lower partition passages 5A to 5C, 6A to 6C. Consequently, a heat exchange area with the exhaust gas becomes larger than a case where no fin is provided, and thereby resulting in that cooling performance improves in comparison with the case where no fin is provided.

However, in a case of the EGR passage 2 provided with the upper fins 3 and the lower fins 4, when an upper die and a lower die for sand-core molding are opened in a course of manufacturing a sand core to be inserted into a mold used for molding the EGR passage 2, the sand core may be easy to be damaged.

Figure 3:
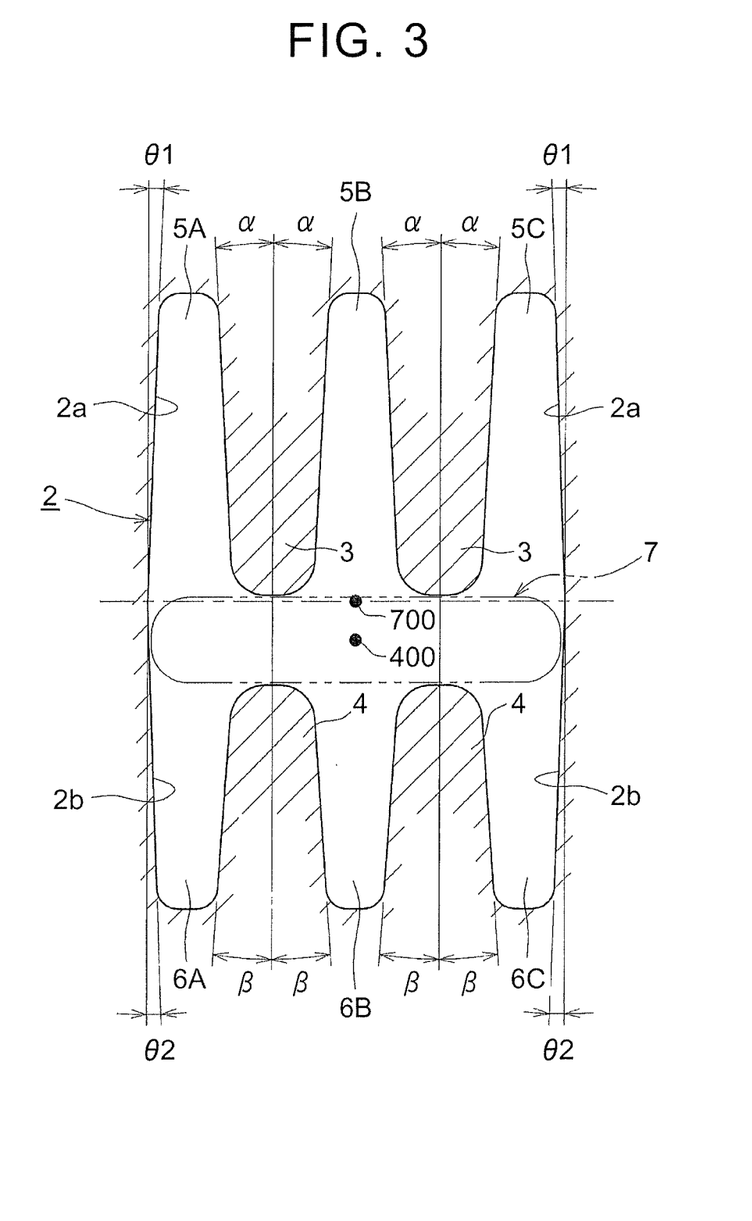
FIG. 3 is a view of a section along a line (3)-(3) in FIG. 2, when viewed from a direction of arrows.
Figure 4:
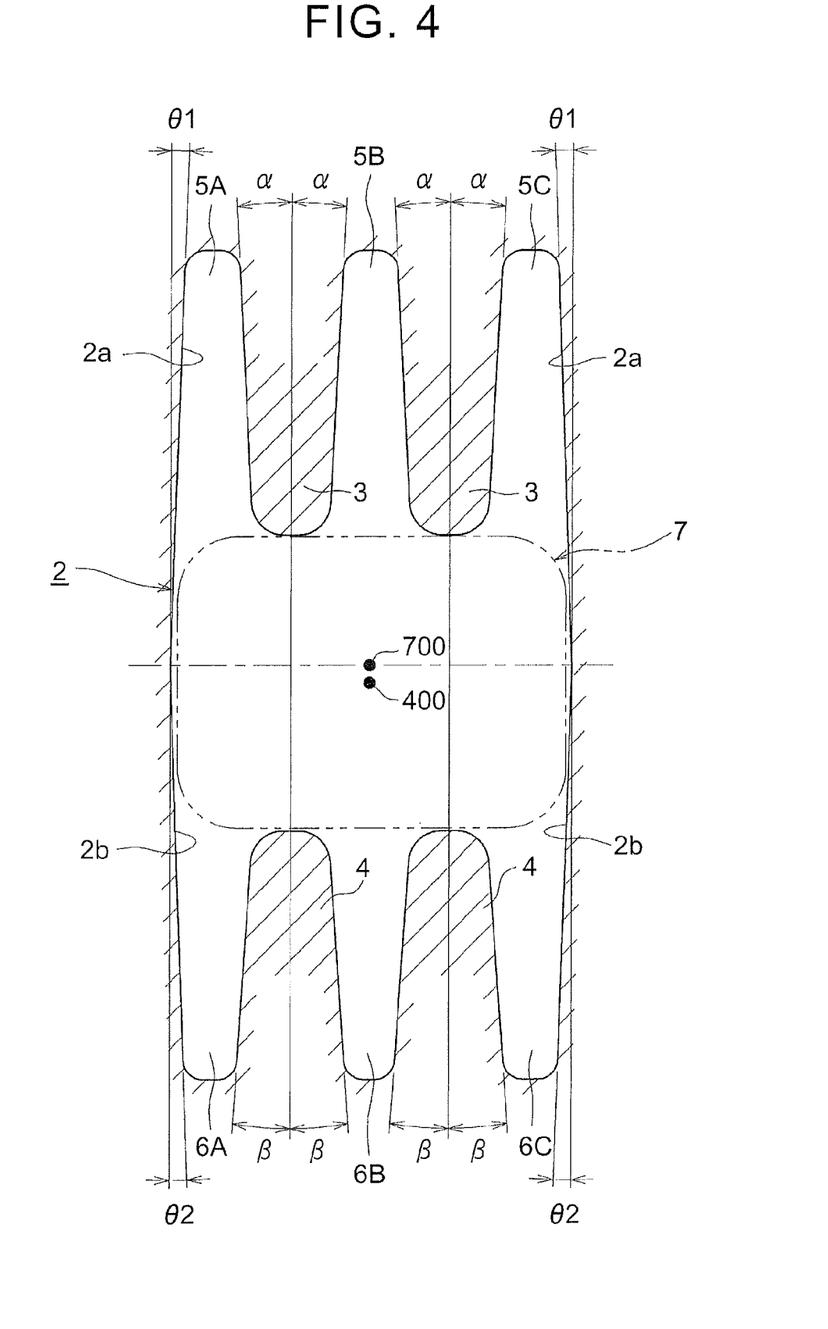
FIG. 4 is a view of a section along a line (4)-(4) in FIG. 2, when viewed from a direction of arrows.
Figure 5:
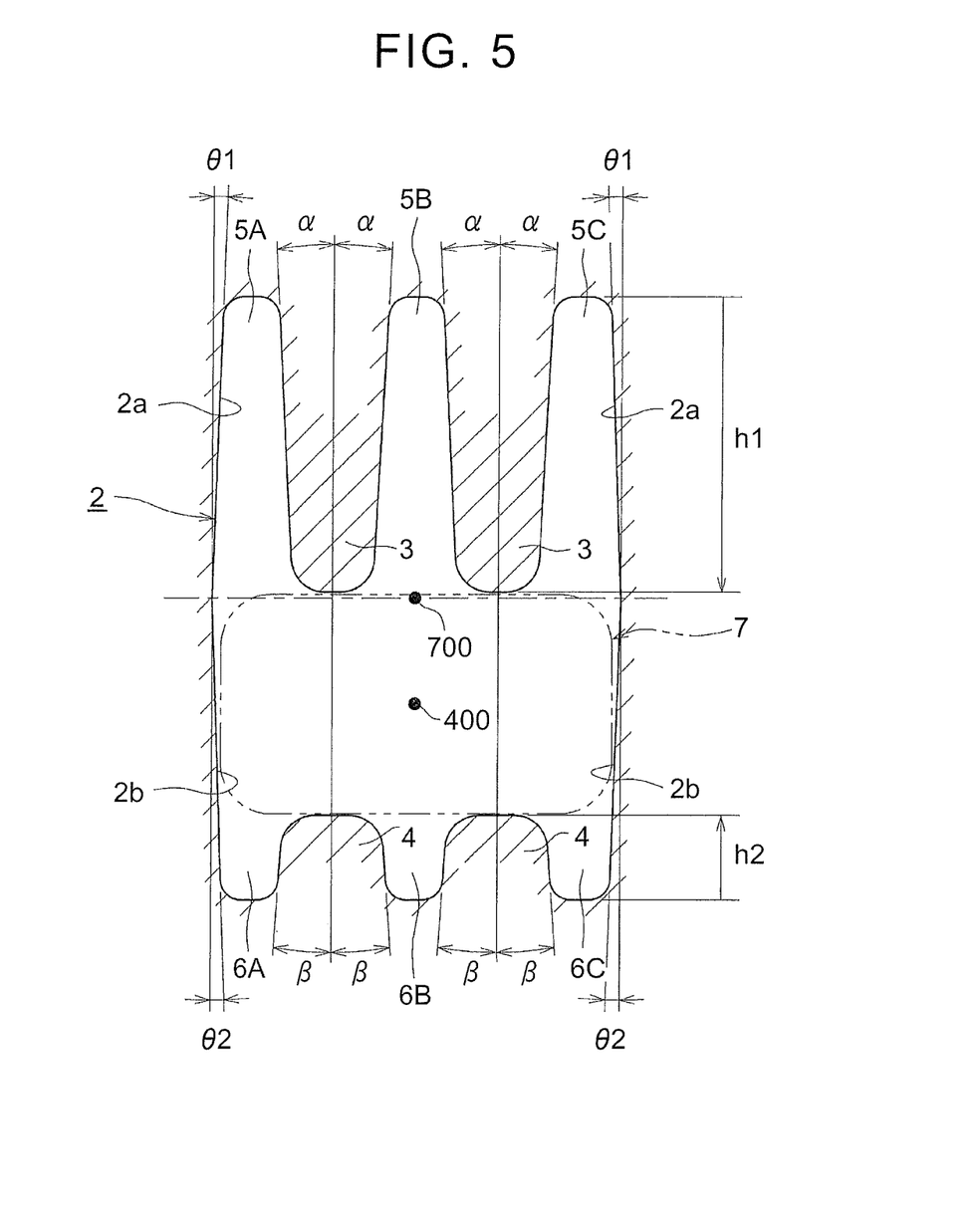
FIG. 5 is a view of a section along a line (5)-(5) in FIG. 2, when viewed from a direction of arrows.

In view of this, in the present embodiment, the upper fins 3 and the lower fins 4 are gradually narrowed in width toward their respective projection directions, so that both sides thereof in the width direction have inclined surfaces. Further, as illustrated in FIGS. 3 to 5, a tilt angle β of the inclined surfaces of the lower fins 4 is made larger than a tilt angle α of the inclined surfaces of the upper fins 3.

Note that, in terms of inner side surfaces of both ends of the EGR passage 2 in the width direction, an upper half region 2a toward an uppermost position from a height-direction center 700, and a lower half region 2b toward a lowest position from the height-direction center 700 have inclined surfaces inclined inwardly in the EGR passage 2. A tilt angle θ1 of the upper half region 2a and a tilt angle θ2 of the lower half region 2b are set to be smaller than the tilt angle α of the inclined surfaces of the upper fins 3, and the tilt angle θ1 and the tilt angle θ2 are set to the same angle. Note that the tilt angle θ1 of the upper half region 2a may be set to the same as the tilt angle α of the inclined surfaces of the upper fins 3, and the tilt angle θ2 of the lower half region 2b may be set to the same as the tilt angle β of the inclined surfaces of the lower fins 4.

The inclined surfaces of the EGR passage 2 are provided so as to form a draft angle to open the upper die and the lower die used for molding the sand core.

In the EGR passage 2 configured as described above, when the upper die and the lower die for sand-core molding are opened in the course of manufacturing the sand core to be inserted into the mold used for molding the EGR passage 2, a difference is caused between a mold release resistance of the upper die and a mold release resistance of the lower die. For example, the mold release resistance of the lower die becomes smaller than the mold release resistance of the upper die.

Hereby, although not illustrated herein, the lower die is easy to be separated from those projection portions of the molded sand core which correspond to the lower fins 4 having the inclined surfaces with a large tilt angle, while the upper die is kept attached to those projection portions of the molded sand core which correspond to the upper fins 3 having the inclined surfaces with a small tilt angle. As a result, the molded sand core is hard to be damaged. Thus, a manufacture yield of the sand core improves, which is advantageous to decrease a manufacturing cost of the EGR passage 2.

After that, the push-out pins or the like provided in the upper die are operated to push out the sand core from the upper die.

Meanwhile, in the present embodiment, as illustrated in FIGS. 2 and 5, a height (height dimension h2) of the lower fins 4 at the intermediate portion 23 is set to be lower (smaller) than a height of the lower fins 4 at the inlet portion 21 and a height of the lower fins 4 at the outlet portion 22, and is also set to be lower (at a lower position) than the height-direction center 700 (only illustrated in FIGS. 3 to 5) of the EGR passage 2. Note that the height (height dimension h2) of the lower fins 4 at the intermediate portion 23 is set to be lower (smaller) than a height (height dimension h1) of the upper fins 3 at the intermediate portion 23.

According to such settings, as illustrated in FIG. 2, a height position of a center line 400 of the main passage 7 in an intermediate region (the intermediate portion 23) of the EGR passage 2 in the exhaust-gas flow direction (the longitudinal direction) is set to be lower (at a lower position) than height positions of the center line 400 of the main passage 7 at the inlet portion 21 (the upstream region in the exhaust-gas flow direction) and the outlet portion 22 (the downstream region in the exhaust-gas flow direction), and is also set to be lower (at a lower position) than the height-direction center 700 (only illustrated in FIGS. 3 to 5) of the EGR passage 2.

Note that the height positions of the center line 400 of the main passage 7 at the inlet portion 21 and at the outlet portion 22 are also set to be lower (at a lower position) than the height-direction center 700 of the EGR passage 2, as illustrated in FIGS. 3, 4.

In such settings, a sectional area of the intermediate portion 23 of the EGR passage 2 becomes as large as possible, so that the following four effects can be obtained.

The first effect is that the rigidity of the sand core to be used for molding the EGR passage 2 improves, so the sand core is further hard to be damaged during manufacturing.

The second effect is that a flow resistance of the exhaust gas flowing through the EGR passage 2 becomes small, so a pressure loss is reduced.

The third effect is as follows. That is, since the intermediate portion 23 is placed lower than the inlet portion 21 and the outlet portion 22 in the vertical direction in the EGR passage 2, condensed water is easy to be accumulated in the intermediate portion 23. However, the height of the lower fins 4 at the intermediate portion 23 is set to be lower than the heights of the lower fins 4 in the other regions, so that condensed water generated in the intermediate portion 23 can be reduced, thereby making it possible to reduce the condensed water retained in the intermediate portion 23.

The fourth effect is as follows. In the intermediate portion 23 of the EGR passage 2, the exhaust gas is easy to enter the bottoms of the lower partition passages 6A to 6C having a large exhaust-gas flow resistance, and the exhaust gas is easy to flow along the bottoms. Accordingly, that condensed water of the exhaust gas which is accumulated in the bottoms are blown off toward the outlet portion 22 by the exhaust gas flowing through the bottoms, so that the condensed water is easy to be discharged outside.

The fourth effect is described below supplementarily. Incidentally, in terms of the shape of the EGR passage 2, in a case where an overall height dimension around the lengthwise-direction center 500 is made smaller than the other parts, so that the region from the lengthwise-direction center 500 to the opening of the outlet portion 22 is inclined diagonally upward, as illustrated in FIG. 2, that condensed water (see reference sign 10 in FIG. 6) of the exhaust gas which is generated in the EGR passage 2 is easy to be accumulated around the lengthwise-direction center 500 of the EGR passage 2 in the bottoms of the lower partition passages 6A to 6C.

Figure 6:
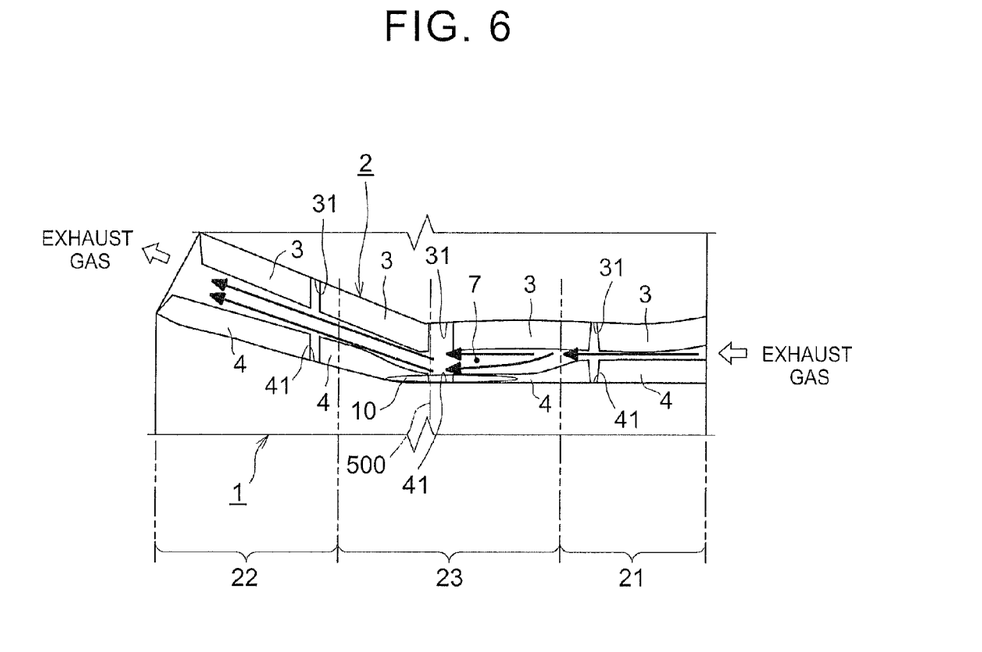
FIG. 6 is a view to describe a flow of exhaust gas in FIG. 2.

Here, in a case where the height of the lower fins 4 at the intermediate portion 23 is set to be lower than the heights of the lower fins 4 at the inlet portion 21 and at the outlet portion 22 and to be lower than the height-direction center 700 as described above, the exhaust gas flowing, at a high flow speed, through the main passage 7 around the lengthwise-direction center 500 of the EGR passage 2 is guided toward the bottoms of the lower partition passages 6A to 6C (the part with a large exhaust-gas flow resistance) as illustrated by bold continuous arrows in FIG. 6. Further, the exhaust gas flowing along the bottoms is just guided toward the outlet portion 22.

Hereby, the condensed water accumulated in the bottoms (see reference sign 10 in FIG. 6) is blown off toward the outlet portion 22 by the exhaust gas flowing, at a relatively high flow speed, through the bottom of the main passage 7 around the lengthwise-direction center 500 of the EGR passage 2, so that the condensed water is easy to be discharged outside from the outlet portion 22. As a result, it is possible to restrain or prevent the condensed water of the exhaust gas from being retained within the EGR passage 2, thereby making it possible to restrain or prevent corrosion of the inner surface of the EGR passage 2.

The present invention is not limited to the above embodiment, but can be modified appropriately within the scope of Claims and within a scope equivalent thereto.

(1) The above embodiment deals with an example in which the inlet portion 21 and the outlet portion 22 are each offset relative to the intermediate portion 23 in a top view of the EGR passage 2. However, the present invention is not limited to this.

The present invention can be also applied to a case where the EGR passage 2 has a shape in which at least either one of the inlet portion 21 and the outlet portion 22 is not offset relative to the intermediate portion 23 in a top view, for example.

(2) The above embodiment deals with an example in which the overall height dimension of the EGR passage 2 around the lengthwise-direction center 500 is made smaller than the other parts, so that the region from a part around the lengthwise-direction center 500 to the opening of the outlet portion 22 is inclined diagonally upward. However, the present invention is not limited to this.

The present invention can be also applied to a case where the EGR passage 2 has a generally straight shape for an overall length in a side view and its overall height dimension is generally uniform for the overall length.

(3) The above embodiment deals with an example in which the tilt angle β of the inclined surfaces of the lower fins 4 is made larger than the tilt angle α of the inclined surfaces of the upper fins 3. However, the present invention is not limited to this.

Figure 7:
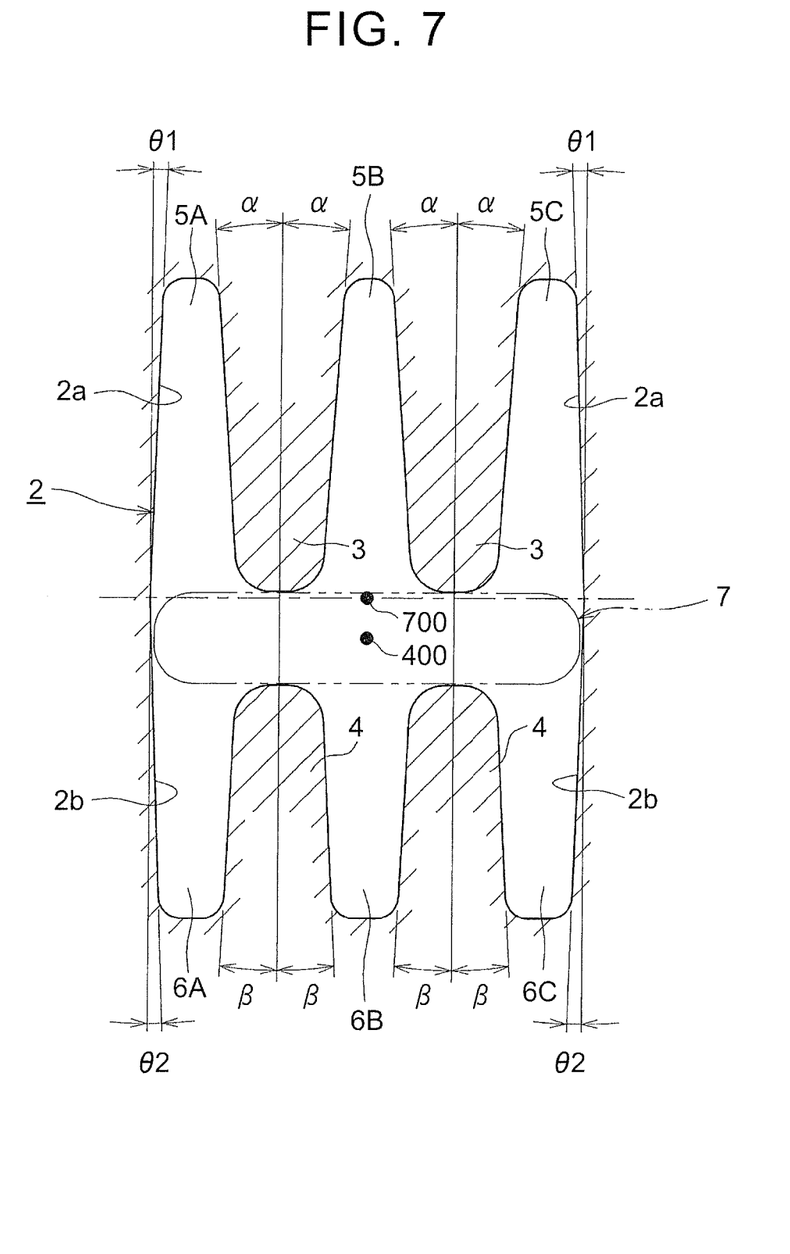
FIG. 7 is a view of another embodiment of the cylinder head provided with the EGR passage according to the present invention, and corresponds to FIG. 3.

For example, as illustrated in FIG. 7, the present invention also includes a case where the tilt angle α of the inclined surfaces of the upper fins 3 is made larger than the tilt angle β of the inclined surfaces of the lower fins 4, conversely to the above.

(4) The above embodiment deals with an example in which the EGR passage 2 is provided inside the cylinder head 1. However, the present invention is not limited to this. The present invention also includes an EGR passage 2 provided separately from the cylinder head 1.

The present invention can be preferably applied to an EGR passage provided with a plurality of upper fins and lower fins.

What is claimed is:

1. A gas pipe for sending exhaust gas discharged from an engine to an air-intake system of the engine, the gas pipe comprising:
   first fins; and
   second fins,
   the first fins and the second fins being configured such that:
   a) the first fins project from a first region of an inner peripheral surface of the gas pipe;
   b) the second fins project from a second region of the inner peripheral surface of the gas pipe, the second region being opposed to the first region;
   c) the second fins face the first fins across a predetermined space;
   d) the first fins extend along an exhaust-gas flow direction;
   e) the second fins extend along the exhaust-gas flow direction;
   f) the first fins are adjacent to each other in a direction perpendicular to the exhaust-gas flow direction;
   g) the second fins are adjacent to each other in the direction perpendicular to the exhaust-gas flow direction;
   h) a thickness of the first fins in the direction perpendicular to the exhaust-gas flow direction is gradually thinned toward a projection direction of the first fins, so that oppositely facing sides of each of the first fins extending along the exhaust-gas flow direction define inclined surfaces;
   i) a thickness of the second fins in the direction perpendicular to the exhaust-gas flow direction is gradually thinned toward a projection direction of the second fins, so that oppositely facing sides of each of the second fins extending along the exhaust-gas flow direction define inclined surfaces; and
   j) a tilt angle of either ones of the inclined surfaces of the first fins and the inclined surfaces of the second fins is larger than a tilt angle of the other ones of the inclined surfaces of the first fins and the inclined surfaces of the second fins.

2. The gas pipe according to claim 1, wherein:
the first fins project downward in a vertical direction;
the second fins project upward in the vertical direction; and
the tilt angle of the inclined surfaces of the second fins is larger than the tilt angle of the inclined surfaces of the first fins.

3. The gas pipe according to claim 1, wherein:
the first fins project downward in a vertical direction;
the second fins project upward in the vertical direction;
the gas pipe includes an inlet portion for the exhaust gas, an outlet portion for the exhaust gas, and an intermediate portion between the inlet portion and the outlet portion;
the intermediate portion is lower than the inlet portion and the outlet portion in the vertical direction;
a height of the second fins at the intermediate portion is lower than a height of the second fins at the inlet portion and a height of the second fins at the outlet portion; and
tip portions of the second fins at the intermediate portion are set to a position lower than a central position in the gas pipe in a height direction of the gas pipe.

4. The gas pipe according to claim 1, wherein
the gas pipe is provided inside a cylinder head.

* * * * *